US012367776B2

(12) United States Patent
Svatek et al.

(10) Patent No.: US 12,367,776 B2
(45) Date of Patent: Jul. 22, 2025

(54) SYSTEM AND METHOD TO OPERATE RADIO OF AIRCRAFT TO CONNECT TO RADIO TOWERS ACCORDING TO COMMAND AND CONTROL COMMUNICATION PLAN

(71) Applicant: Rockwell Collins, Inc., Cedar Rapids, IA (US)

(72) Inventors: Boe A. Svatek, Cedar Rapids, IA (US); Abhishek Dharmesh Rane, Marion, IA (US); Paul A. Lenhardt, Marion, IA (US); Nicholas J. Liberko, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 398 days.

(21) Appl. No.: 18/110,720

(22) Filed: Feb. 16, 2023

(65) Prior Publication Data

US 2024/0282198 A1   Aug. 22, 2024

(51) Int. Cl.
*G08G 5/26* (2025.01)
*B64U 10/00* (2023.01)
*H04L 5/00* (2006.01)
*H04W 36/00* (2009.01)
*B64U 101/00* (2023.01)

(52) U.S. Cl.
CPC .............. *G08G 5/26* (2025.01); *B64U 10/00* (2023.01); *H04L 5/0023* (2013.01); *H04L 5/006* (2013.01); *H04W 36/00* (2013.01); *B64U 2101/00* (2023.01)

(58) Field of Classification Search
CPC ........ G08G 5/26; B64U 10/00; H04L 5/0023; H04L 5/006; H04W 36/00
See application file for complete search history.

(56) References Cited

U.S. PATENT DOCUMENTS

| | | |
|---|---|---|
| 8,972,311 B2 | 3/2015 | Srikanteswara et al. |
| 10,582,401 B2 | 3/2020 | Mengwasser et al. |
| 10,848,253 B1 | 11/2020 | Liberko et al. |
| 11,303,368 B2 | 4/2022 | Elmasry et al. |
| 11,304,061 B2 | 4/2022 | Elmasry et al. |
| 11,345,473 B1 | 5/2022 | Liberko et al. |
| 11,423,789 B2 | 8/2022 | Svatek et al. |
| 2017/0357273 A1* | 12/2017 | Michini ............... G05D 1/106 |
| 2018/0324595 A1 | 11/2018 | Shima |
| 2018/0352441 A1 | 12/2018 | Zheng et al. |
| 2021/0118312 A1 | 4/2021 | Takács |
| 2021/0407304 A1 | 12/2021 | Barney et al. |

(Continued)

OTHER PUBLICATIONS

EP Search Report for European Application No. EP23210205.3 dated Jun. 3, 2024, 8 pages.

*Primary Examiner* — Curtis B Odom
(74) *Attorney, Agent, or Firm* — Suiter Swantz IP (57) ABSTRACT

A system may include a radio and a processor. The processor may be configured to: obtain information of a flight plan; obtain a command and control (C2) communication plan; and output instructions to operate the radio to connect with at least one given antenna of at least one given radio tower at a given time according to the C2 communication plan. The radio may be configured to connect with the at least one given antenna of the at least one given radio tower at the given time according to the C2 communication plan.

20 Claims, 6 Drawing Sheets

(56) References Cited

U.S. PATENT DOCUMENTS

| | | |
|---|---|---|
| 2022/0028283 A1 | 1/2022 | Liberko et al. |
| 2022/0086652 A1 | 3/2022 | Elmasry et al. |
| 2022/0210659 A1 | 6/2022 | Montalvo et al. |
| 2022/0217706 A1 | 7/2022 | Casey et al. |

\* cited by examiner

SYSTEM AND METHOD TO OPERATE RADIO OF AIRCRAFT TO CONNECT TO RADIO TOWERS ACCORDING TO COMMAND AND CONTROL COMMUNICATION PLAN

BACKGROUND

Beyond visual line of sight (BVLOS) uncrewed aerial system (UAS) operations require robust and secure command and control (C2) data link connectivity. Spectrum available for such purpose is limited and shared. Spectrum availability for C2 is so constrained that such availability may be the limiting factor determining density of UAS operations. The C2 challenge is so great that there is a Radio Technical Commission for Aeronautics (RTCA) committee focused on how a UAS should behave in the condition of a loss of C2 link. RTCA DO-362 defines C2 waveforms and a spectrum utilization structure.

SUMMARY

In one aspect, embodiments of the inventive concepts disclosed herein are directed to a system. The system may include at least one radio and at least one processor, one or more of the at least one processor communicatively coupled to the at least one radio. The at least one processor may be configured to: obtain information of a flight plan associated with a flight of an aircraft, the flight plan including information of a planned flight start point, a planned flight end point, a planned flight route, and a planned timing associated with the planned flight route; obtain a command and control (C2) communication plan for the flight of the aircraft, the C2 communication plan including information of a spectrum allocated for each coverage area aligned with the flight plan, modeled spectrum quality metrics along the planned flight route, anticipated tower to tower handoff locations along the planned flight route, and anticipated antenna-to-antenna handoff locations by a single radio tower along the planned flight route; and output instructions to operate the at least one radio to connect with at least one given antenna of at least one given radio tower at a given time according to the C2 communication plan. The at least one radio may be configured to connect with the at least one given antenna of the at least one given radio tower at the given time according to the C2 communication plan.

In a further aspect, embodiments of the inventive concepts disclosed herein are directed to a method. The method may include: obtaining, by at least one processor, information of a flight plan associated with a flight of an aircraft, the flight plan including information of a planned flight start point, a planned flight end point, a planned flight route, and a planned timing associated with the planned flight route, wherein one or more of the at least one processor are communicatively coupled to the at least one radio; obtaining, by the at least one processor, a command and control (C2) communication plan for the flight of the aircraft, the C2 communication plan including information of a spectrum allocated for each coverage area aligned with the flight plan, modeled spectrum quality metrics along the planned flight route, anticipated tower to tower handoff locations along the planned flight route, and anticipated antenna-to-antenna handoff locations by a single radio tower along the planned flight route; outputting, by the at least one processor, instructions to operate the at least one radio to connect with at least one given antenna of at least one given radio tower at a given time according to the C2 communication plan; and connecting, by the at least one radio, with the at least one given antenna of the at least one given radio tower at the given time according to the C2 communication plan.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and method to operate at least one radio of an aircraft (e.g., a crewed and/or piloted aircraft or a UAS (e.g., a remote piloted UAS or an autonomous UAS) to connect to at least one radio tower according to a C2 communication plan.

Some embodiments may utilize at least one processor (e.g., configured as and/or configured to execute an avoidance re-router to voxel deconfliction engine) to manage C2 channel allocation for the aircraft. Some embodiments may apply volume deconfliction artificial intelligence to automatically manage and deterministically assign spectrum by conceptualizing spectrum as a spatial dimension. For example, the spectrum and/or channels may be allocated based on four-dimensions. The four dimensions may include a planned latitude of the aircraft or a spectrum usage location at a given time, a planned longitude of the aircraft or the spectrum usage location at a given time, time, and at least one given channel at the given time as a vertical dimension. The C2 communication plan may include voxels. Each of the voxels may be a three-dimensional data point for a particular time, wherein each voxel includes a planned latitude of the aircraft or the spectrum usage location at the particular time, the planned longitude of the aircraft or the spectrum usage location at the particular time, and at least one given channel at the particular time as a vertical dimension. At least one ground processor, located on the ground and communicatively coupled to at least two radio towers and the aircraft at any given time, may be configured to deconflict spectrum allocation for a plurality of other C2 communication plans of other aircraft and the C2 communication plan of the aircraft by using voxels, each of the voxels associated with one of the plurality of other C2 communication plans of the other aircraft and the C2 communication plan of the aircraft. In some embodiments, by conceptualizing spectrum and/or channels as an altitude dimension, latitude and longitude spatial allocation is preserved. With spectrum reimagined as altitude, or more generically a z dimension with discrete channels or lanes, some embodiments may apply spatial planning and deconfliction methods to manage spectrum allocations.

In some embodiments, maintaining positive C2 over a UAS for BVLOS flights is important to mission success, aircraft safety, and community safety.

Some embodiments may include a method to urgently and automatically plan spectrum allocation in concert with flight planning, which may provide for denser UAS operations than currently allowed.

Figure 1:
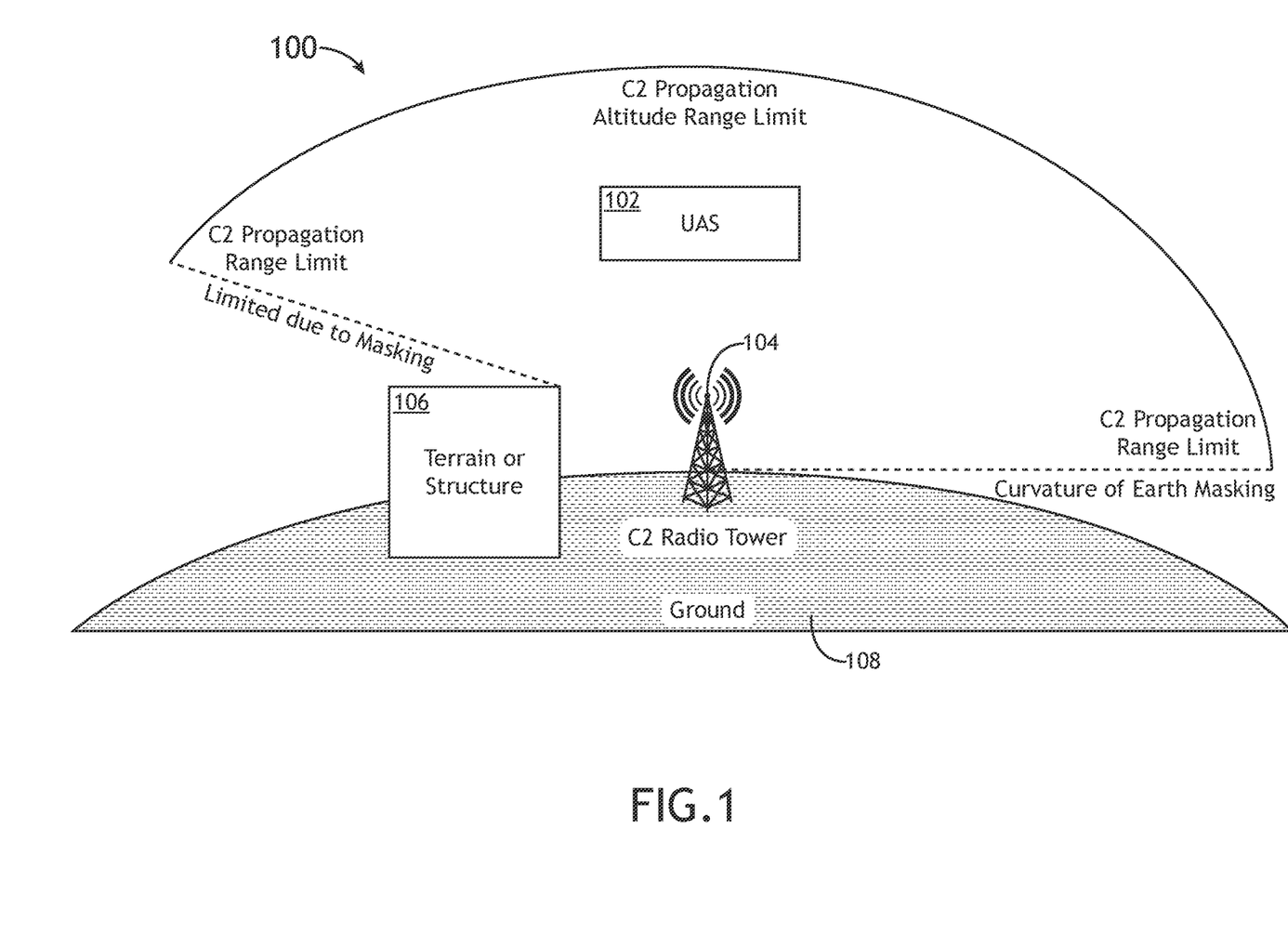
FIG. 1 is a view of a coverage volume and a system of an exemplary embodiment according to the inventive concepts disclosed herein.

Referring now to FIG. 1 an exemplary embodiment of a system 100 is shown. FIG. 1 shows a view of a coverage volume, which may be useful for flight planning. The system may include at least one aircraft (e.g., at least one piloted and/or crewed aircraft and/or at least one UAS 102), at least one radio tower (e.g., at least one C2 radio tower 104), terrain or structure 106, and/or ground 108, some of which may be communicatively coupled at any given time.

Figure 2A:
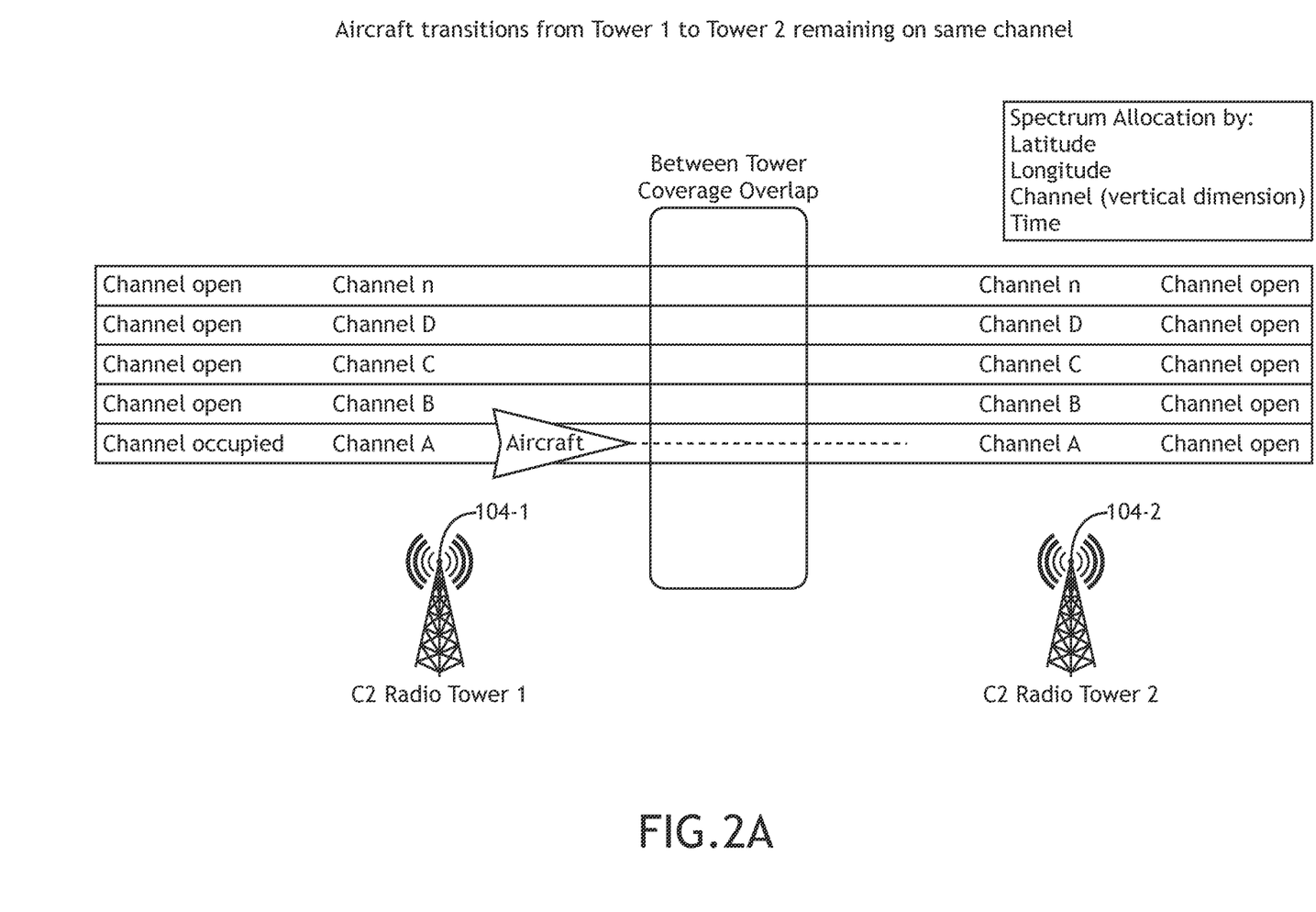
FIG. 2A is an exemplary chart illustrative of an aircraft transition from a first C2 radio tower to a second C2 radio tower while remaining on a same channel of an exemplary embodiment according to the inventive concepts disclosed herein.

Referring now to FIG. 2A, a view of an exemplary chart illustrative of an aircraft (e.g., UAS 102) transition from a first C2 radio tower 104-1 to a second C2 radio tower 104-2 while remaining on a same channel of some embodiments is shown. As shown, the spectrum can be allocated based on four dimensions: latitude, longitude, channel (which may be modeled as a vertical dimension for a voxel), and time. FIG. 2A shows the aircraft travelling from the first C2 radio tower 104-1 coverage volume to the second C2 radio tower 104-2 coverage volume with coverage overlapping for a region between the towers 104-1, 104-2. The aircraft may be able to stay on a same channel as because such channel is open on the second C2 radio tower 104-2. This may also assume that adjacent towers can share channels and that the first and second C2 radio towers 104-1, 104-2 can dynamically allocate spectrum between towers 104-1, 104-2. In some embodiments, each tower 104-1, 104-2 has its own discrete set of channels that are different from and not interfering with an adjacent tower's channels.

Figure 2B:
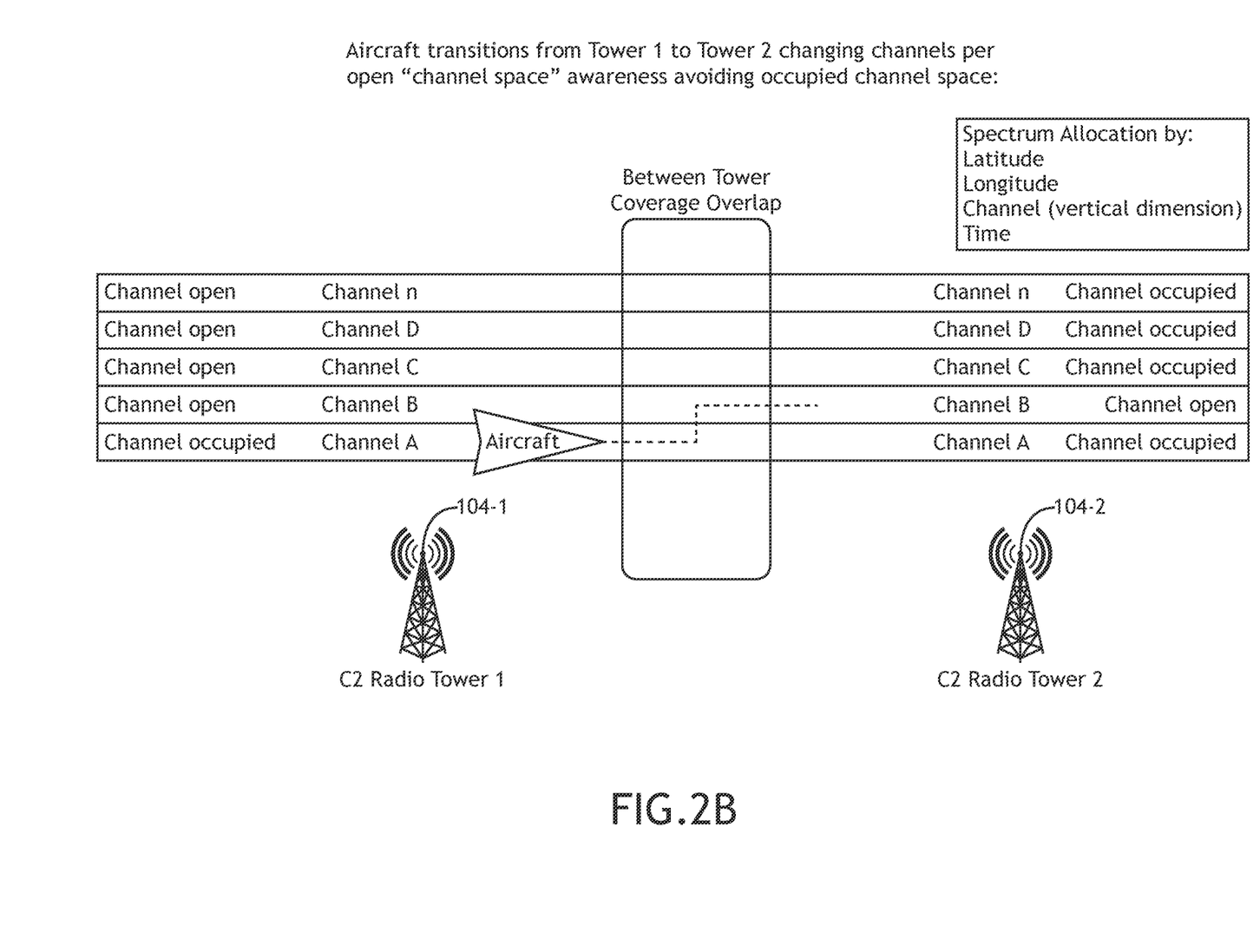
FIG. 2B is an exemplary chart illustrative of an aircraft transition from a first C2 radio tower on a first channel to a second C2 radio tower on a different channel of an exemplary embodiment according to the inventive concepts disclosed herein.

Referring now to FIG. 2B, a view of an exemplary chart illustrative of an aircraft (e.g., UAS 102) transition from a first C2 radio tower 104-1 on a first channel to a second C2 radio tower 104-2 on a different channel of some embodiments is shown. As shown, the spectrum can be allocated based on four dimensions: latitude, longitude, channel (which may be modeled as a vertical dimension for a voxel), and time. FIG. 2B shows the aircraft is transitioning from coverage volume of the first C2 radio tower 104-1 to coverage volume of the second C2 radio tower 104-2. It also shows that the aircraft will have to be switched from channel A to channel B allocated by at least one processor (e.g., which may be implemented as and/or may execute a spectrum planning engine (SPE)) because channel A is allocated to another aircraft on the second C2 radio tower 104-2.

Figure 2C:
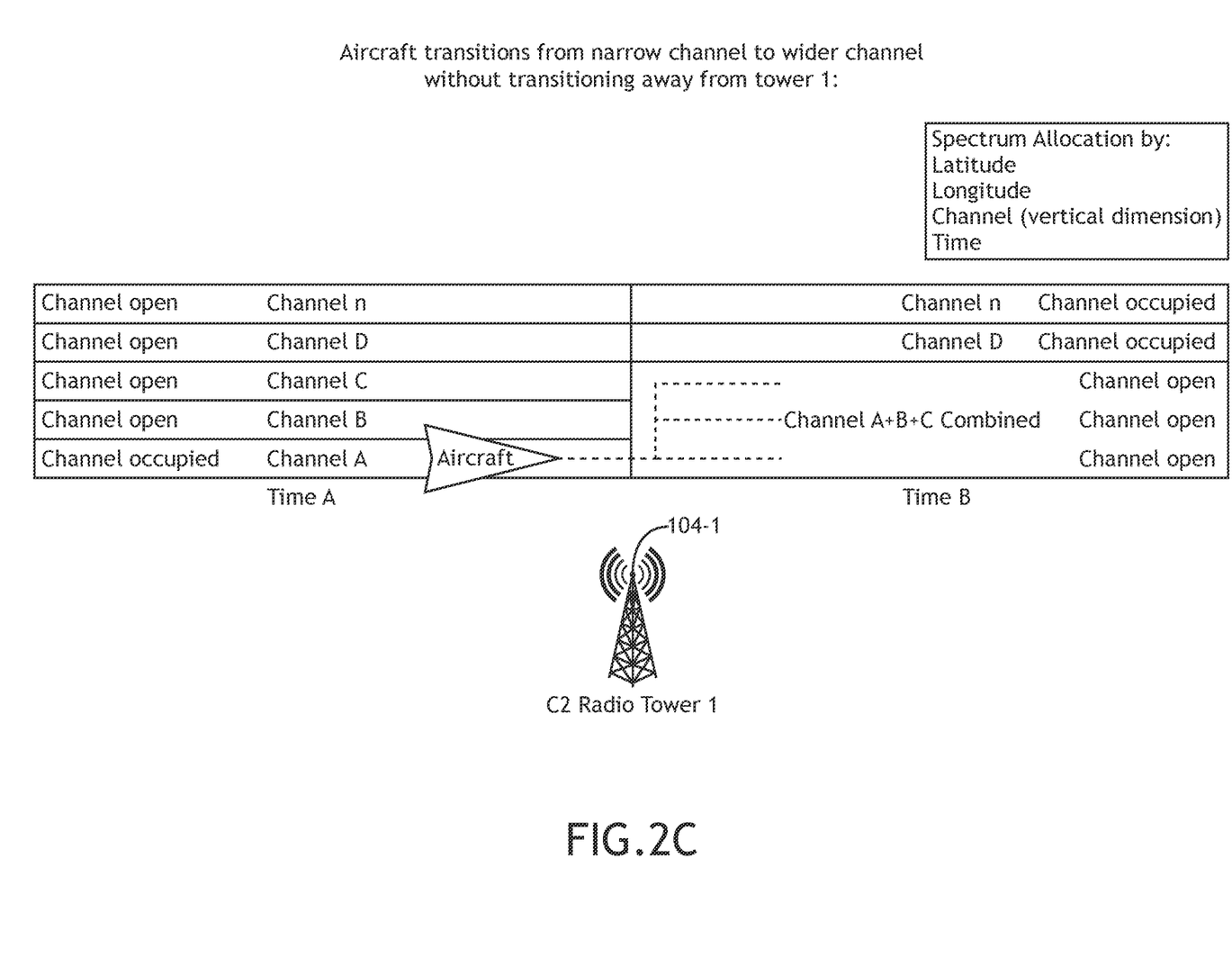
FIG. 2C is an exemplary chart illustrative of an aircraft transition from a narrower channel to a wider channel on a first C2 radio tower of an exemplary embodiment according to the inventive concepts disclosed herein.

Referring now to FIG. 2C, a view of an exemplary chart illustrative of an aircraft (e.g., UAS 102) transition from a narrower channel to a wider channel on a first C2 radio tower 104-1 of some embodiments is shown. As shown, the spectrum can be allocated based on four dimensions: latitude, longitude, channel (which may be modeled as a vertical dimension for a voxel), and time. FIG. 2C shows that the aircraft has a spectrum bandwidth change required and an allocation by at least one processor (e.g., which may be implemented as and/or may execute a spectrum planning engine (SPE)) may change spectrum allocated from one channel to three.

Figure 3:
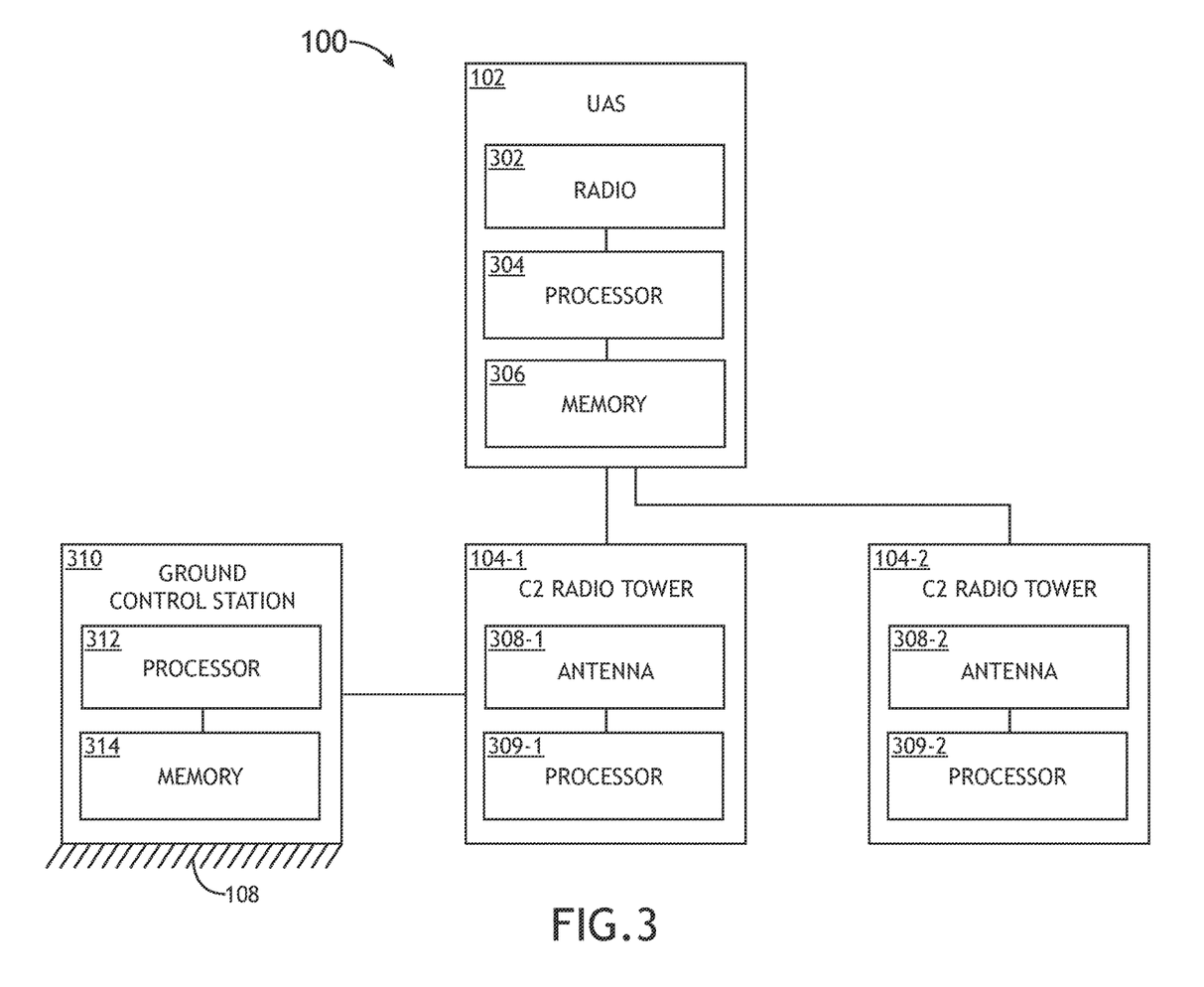
FIG. 3 is a view of an exemplary embodiment of the system according to the inventive concepts disclosed herein.

Referring now to FIG. 3, an exemplary embodiment of the system 100 according to the inventive concepts disclosed herein is depicted. In some embodiments, the system 100 may include at least one aircraft (e.g., at least one UAS 102), at least one radio tower (e.g., at least one C2 radio tower 104-1, 104-2), and/or a ground control station 310, some or all of which may be communicatively coupled at any given time.

In some embodiments, the ground control station 310 may include at least one processor 312, at least one memory 314, and/or at least one storage (not shown), some or all of which may be communicatively coupled at any given time. For example, the at least one processor 312 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 312 may include a CPU and a GPU configured to perform (e.g., collectively perform) any of the operations disclosed throughout. The at least one processor 312 may be configured to run various software applications (e.g., an SPE and/or a flight planning engine (FPE)) or computer code stored (e.g., maintained) in a non-transitory computer-readable medium (e.g., memory 314 and/or storage) and configured to execute various instructions or operations. The at least one processor 312 may be configured to perform any or all of the operations disclosed throughout.

For example, the at least one processor 312 of the ground control station 310 may be configured to prepare a C2 communication plan by preplanning. For example, the at least one processor 312 of the ground control station 310 may be configured to: identify a flight need (e.g., carrying passengers and/or packages, or conducting information gathering); determine a flight start point, a flight endpoint, a route, and planned timing of the route; ingest, such as by the SPE, four-dimensional flight intent; utilize, such as by the SPE, known spectrum available to automatically allocate spectrum and create a C2 communication plan for the flight, wherein the C2 communication plan may include spectrum allocated for each coverage area aligned with the flight plan, modelled spectrum quality metrics along the route (e.g., signal to nose ratio (SNR), noise floor, probability of packet loss, error correction, etc.), anticipated tower to tower handoff locations, anticipated antenna to antenna handoff locations for a same tower; and/or transfer the C2 communication plan to the aircraft in whole or parts before and/or during flight.

For example, the at least one processor 312 of the ground control station 310 may be configured to prepare a C2 communication plan by preplanning with spectrum conflict or spectrum saturation. For example, the at least one processor 312 of the ground control station 310 may be configured to: identify a flight need (e.g., carrying passengers and/or packages, or conducting information gathering); determine a flight start point, a flight endpoint, a route, and planned timing of the route; ingest, such as by the SPE, four-dimensional flight intent; utilize, such as by the SPE, known spectrum available to automatically allocate spectrum and create a C2 communication plan for the flight, wherein the C2 communication plan may include spectrum allocated for each coverage area aligned with the flight plan, modelled spectrum quality metrics along the route (e.g., signal to nose ratio (SNR), noise floor, probability of packet loss, error correction, etc.), anticipated tower to tower handoff locations, anticipated antenna to antenna handoff locations for a same tower; identify, such as by the SPE, saturation and outputs when and where spectrum conflict and/or saturation will occur and outputs a deconflicted recommendation resolution; transfer, such as by the SPE, conflict and recommended resolution to the flight planning engine (FPE); create, such as by the FPE, a new deconflicted flight plan and transfer the deconflicted flight plan to the SPE for validation of acceptable C2 communication plan; create, such as by the SPE, a new C2 communication plan; and/or transfer the new C2 communication plan to the aircraft in whole or parts before and/or during flight.

For example, the at least one processor 312 of the ground control station 310 may be configured to prepare a C2 communication plan during flight and handle contingencies. For example, the at least one processor 312 of the ground control station 310 may be configured to: identify a flight plan change (such as caused by weather, deconfliction requirement from an unanticipated crewed or uncrewed aircraft, aircraft mission change, and/or a destination change); determine a new route with a flight start point, a flight endpoint, a route, and planned timing of the route; ingest, such as by the SPE, four-dimensional flight intent; utilize, such as by the SPE, known spectrum available to automatically allocate spectrum and create a C2 communication plan for the flight, wherein the C2 communication plan may include spectrum allocated for each coverage area aligned with the flight plan, modelled spectrum quality metrics along the route (e.g., signal to nose ratio (SNR), noise floor, probability of packet loss, error correction, etc.), anticipated tower to tower handoff locations, anticipated antenna to antenna handoff locations for a same tower; output a contingency recommendation resolution; transfer, such as by the SPE, the contingency resolution to the flight planning engine (FPE); create, such as by the FPE, a new contingency flight plan and transfer the contingency flight plan to the SPE for validation of acceptable C2 communication plan; create, such as by the SPE, a new C2 communication plan; and/or transfer the new C2 communication plan to the aircraft in whole or parts before and/or during flight.

The radio towers (e.g., C2 radio towers 104-1, 104-2) may be configured to bidirectionally and/or unidirectionally communicate with the aircraft (e.g., UAS 102) via at least one antenna 308-1, 308-2 and at least one processor 309-1, 309-2, at any given time. For example, the radio towers may be configured to receive and send C2 communication plans and flight plans to and from the aircraft, another radio tower, and the ground control station 310.

As shown in FIG. 3, the aircraft (e.g., a crewed aircraft or a UAS 102) may include at least one radio 302, at least one processor 304, at least one memory 306, and/or at least one storage (not shown), some or all of which may be communicatively coupled at any given time. For example, the at least one processor 304 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 304 may include a CPU and a GPU configured to perform (e.g., collectively perform) any of the operations disclosed throughout. The processor 304 may be configured to run various software applications or computer code stored (e.g., maintained) in a non-transitory computer-readable medium (e.g., memory 306 and/or storage) and configured to execute various instructions or operations. The processor 304 may be configured to perform any or all of the operations disclosed throughout. For example, the processor 304 may be configured to: obtain information of a flight plan associated with a flight of the aircraft (e.g., 102), the flight plan including information of a planned flight start point, a planned flight end point, a planned flight route, and a planned timing associated with the planned flight route; obtain a command and control (C2) communication plan for the flight of the aircraft, the C2 communication plan including information of a spectrum allocated for each coverage area aligned with the flight plan, modeled spectrum quality metrics along the planned flight route, anticipated tower to tower handoff locations along the planned flight route, and anticipated antenna-to-antenna handoff locations by a single radio tower along the planned flight route; and/or output instructions to operate the at least one radio 302 to connect with at least one given antenna 308-1, 308-2 of at least one given radio tower at a given time according to the C2 communication plan. The at least one radio 302 may be configured to: connect with the at least one given antenna 308-1, 308-2 of the at least one given radio tower at the given time according to the C2 communication plan.

For example, the spectrum may be allocated based on four-dimensions. In some embodiments, the four dimensions comprise a planned latitude of the aircraft or the spectrum usage location at a given time, a planned longitude of the aircraft or the spectrum usage location at a given time, time, and at least one given channel at the given time as a vertical dimension.

In some embodiments, the C2 communication plan includes voxels, wherein each of the voxels is a three-dimensional data point for a particular time, wherein each voxel includes a planned latitude of the aircraft or the spectrum usage location at the particular time, the planned longitude of the aircraft or the spectrum usage location at the particular time, and at least one given channel at the particular time as a vertical dimension. In some embodiments, the system includes at least two radio towers (e.g., 104-1, 104-2) and at least one ground processor (e.g., 312) located on the ground 108, the at least one ground processor (e.g., 312) communicatively coupled to the at least two radio towers (e.g., 104-1, 104-2) and the aircraft (e.g., 102) at any given time, wherein the at least one ground processor (e.g., 312) is configured to deconflict spectrum allocation for a plurality of other C2 communication plans of other aircraft and the C2 communication plan of the aircraft (e.g., 102) by using voxels, each of the voxels associated with one of the plurality of other C2 communication plans of the other aircraft and the C2 communication plan of the aircraft (e.g., 102).

In some embodiments, the at least one processor 304 is further configured to output instructions to transition C2 communications from a first radio tower (e.g., 104-1) to a second radio tower (e.g., 104-2) while remaining on a same channel or same channels.

In some embodiments, the at least one processor 304 is further configured to output instructions to transition C2 communications from a first radio tower (e.g., 104-1) on a first channel to a second radio tower (e.g., 104-2) on a second channel.

In some embodiments, the at least one processor 304 is further configured to output instructions to transition C2 communications from a first radio tower (e.g., 104-1) on a first channel to a second radio tower (e.g., 104-2) on multiple channels.

In some embodiments, the at least one processor 304 is further configured to output instructions to transition C2 communications from a first radio tower (e.g., 104-1) on multiple channels to a second radio tower (e.g., 104-2) on a single channel.

In some embodiments, the at least one processor 304 is further configured to output instructions to transition C2 communications from a first radio tower (e.g., 104-1) on multiple channels to a second radio tower (e.g., 104-2) on multiple other channels.

In some embodiments, the at least one processor 304 is further configured to output instructions to transition C2 communications from a first radio tower (e.g., 104-1) on a first channel to the first radio tower (e.g., 104-1) on multiple channels.

In some embodiments, the at least one processor 304 is further configured to output instructions to transition C2 communications from a first radio tower (e.g., 104-1) on multiple channels to the first radio tower (e.g., 104-1) on a single channel.

In some embodiments, the at least one processor 304 is further configured to output instructions to transition C2 communications from a first radio tower (e.g., 104-1) on multiple channels to the first radio tower (e.g., 104-1) on multiple other channels.

In some embodiments, the at least one processor 304 is further configured to output instructions to operate the aircraft (e.g., 102) according to the flight plan, wherein based on the instructions to operate the aircraft (e.g., 102) according to the flight plan, the aircraft (e.g., 102) is configured to operate according to the flight plan.

In some embodiments, the modeled spectrum quality metrics include at least one of a signal to noise ratio (SNR), a noise floor, a probability of packet loss, and/or error correction.

In some embodiments, the at least one processor 304 is further configured to: upon a change to the flight plan, obtain an updated C2 communication plan for the flight of the aircraft (e.g., 102); and output updated instructions to operate the at least one radio 302 according to the updated C2 communication plan. In some embodiments, if the C2 communication plan associated with the flight plan is rejected, then the C2 communication planner may offer the flight planning engine a solution that works. This may cause the flight planner to reassess and construct an adjusted flight plan. The C2 communication plan recommendation may come with multiple options for the flight planner to assess. Likewise, the flight planner may initially offer flight plans in order of preference for the C2 communication planner to assess. Each planning engine may offer to each other waypoints, legs or other characteristics that are acceptably altered for better insight into change options that can be accommodated to ease the complexity or number of iterations required for the planning, especially in the case where multiple and/or dense operations occur.

In some embodiments, the C2 communication plan is a real-time C2 communication plan for the flight of the aircraft (e.g., 102).

At least one processor (e.g., the at least one processor 304, the at least one processor 309-1, 309-2, and/or the at least one processor 312,) may be configured to perform (e.g., collectively perform) any or all of the operations disclosed throughout.

Figure 4:
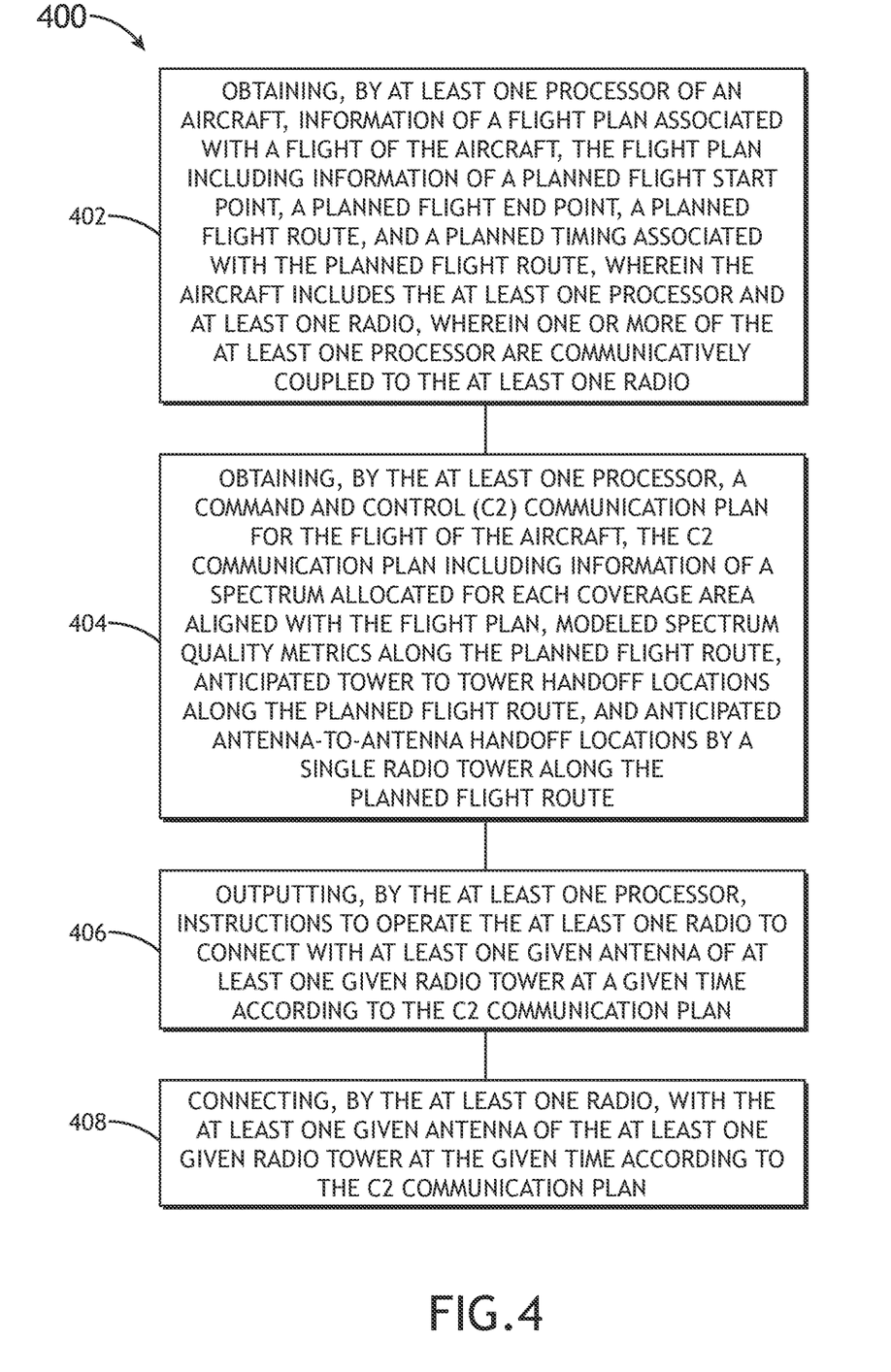
FIG. 4 is a diagram of an exemplary embodiment of a method according to the inventive concepts disclosed herein.

Referring now to FIG. 4, an exemplary embodiment of a method 400 according to the inventive concepts disclosed herein may include one or more of the following steps. Additionally, for example, some embodiments may include performing one or more instances of the method 400 iteratively, concurrently, and/or sequentially. Additionally, for example, at least some of the steps of the method 400 may be performed in parallel and/or concurrently. Additionally, in some embodiments, at least some of the steps of the method 400 may be performed non-sequentially.

A step 402 may include obtaining, by at least one processor of an aircraft, information of a flight plan associated with a flight of the aircraft, the flight plan including information of a planned flight start point, a planned flight end point, a planned flight route, and a planned timing associated with the planned flight route, wherein the aircraft includes the at least one processor and at least one radio, wherein one or more of the at least one processor are communicatively coupled to the at least one radio.

A step 404 may include obtaining, by the at least one processor, a command and control (C2) communication plan for the flight of the aircraft, the C2 communication plan including information of a spectrum allocated for each coverage area aligned with the flight plan, modeled spectrum quality metrics along the planned flight route, anticipated tower to tower handoff locations along the planned flight route, and anticipated antenna-to-antenna handoff locations by a single radio tower along the planned flight route.

A step 406 may include outputting, by the at least one processor, instructions to operate the at least one radio to connect with at least one given antenna of at least one given radio tower at a given time according to the C2 communication plan.

A step 408 may include connecting, by the at least one radio, with the at least one given antenna of the at least one given radio tower at the given time according to the C2 communication plan.

Further, the method 400 may include any of the operations disclosed throughout.

As will be appreciated from the above, embodiments of the inventive concepts disclosed herein may be directed to a system and method to operate at least one radio of an aircraft (e.g., a crewed and/or piloted aircraft or a UAS (e.g., a remote piloted UAS or an autonomous UAS) to connect to at least one radio tower according to a C2 communication plan.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
at least one radio;
at least one processor, one or more of the at least one processor communicatively coupled to the at least one radio, the at least one processor configured to:
obtain information of a flight plan associated with a flight of an aircraft, the flight plan including information of a planned flight start point, a planned flight end point, a planned flight route, and a planned timing associated with the planned flight route;
obtain a command and control (C2) communication plan for the flight of the aircraft, the C2 communication plan including information of a spectrum allocated for each coverage area aligned with the flight plan, modeled spectrum quality metrics along the planned flight route, anticipated tower to tower handoff locations along the planned flight route, and anticipated antenna-to-antenna handoff locations by a single radio tower along the planned flight route; and
output instructions to operate the at least one radio to connect with at least one given antenna of at least one given radio tower at a given time according to the C2 communication plan;

wherein the at least one radio is configured to connect with the at least one given antenna of the at least one given radio tower at the given time according to the C2 communication plan.

2. The system of claim 1, wherein the spectrum is allocated based on four-dimensions, wherein the four dimensions comprise a planned latitude of the aircraft or a spectrum usage location at a given time, a planned longitude of the aircraft or the spectrum usage location at a given time, time, and at least one given channel at the given time.

3. The system of claim 2, wherein a dimension of the at least one given channel at the given time is a vertical dimension.

4. The system of claim 2, wherein the C2 communication plan includes voxels, wherein each of the voxels is a three-dimensional data point for a particular time, wherein each voxel includes a planned latitude of the aircraft or the spectrum usage location at the particular time, the planned longitude of the aircraft or the spectrum usage location at the particular time, and at least one given channel at the particular time as a vertical dimension.

5. The system of claim 4, further comprising at least two radio towers and at least one ground processor located on the ground, the at least one ground processor communicatively coupled to the at least two radio towers and the aircraft at any given time, wherein the at least one ground processor is configured to deconflict spectrum allocation for a plurality of other C2 communication plans of other aircraft and the C2 communication plan of the aircraft by using voxels, each of the voxels associated with one of the plurality of other C2 communication plans of the other aircraft and the C2 communication plan of the aircraft.

6. The system of claim 1, wherein the aircraft is an uncrewed aerial system (UAS).

7. The system of claim 1, wherein the at least one processor is further configured to output instructions to transition C2 communications from a first radio tower to a second radio tower while remaining on a same channel or same channels.

8. The system of claim 1, wherein the at least one processor is further configured to output instructions to transition C2 communications from a first radio tower on a first channel to a second radio tower on a second channel.

9. The system of claim 1, wherein the at least one processor is further configured to output instructions to transition C2 communications from a first radio tower on a first channel to a second radio tower on multiple channels.

10. The system of claim 1, wherein the at least one processor is further configured to output instructions to transition C2 communications from a first radio tower on multiple channels to a second radio tower on a single channel.

11. The system of claim 1, wherein the at least one processor is further configured to output instructions to transition C2 communications from a first radio tower on multiple channels to a second radio tower on multiple other channels.

12. The system of claim 1, wherein the at least one processor is further configured to output instructions to transition C2 communications from a first radio tower on a first channel to the first radio tower on multiple channels.

13. The system of claim 1, wherein the at least one processor is further configured to output instructions to transition C2 communications from a first radio tower on multiple channels to the first radio tower on a single channel.

14. The system of claim 1, wherein the at least one processor is further configured to output instructions to operate the aircraft according to the flight plan, wherein based on the instructions to operate the aircraft according to the flight plan, the aircraft is configured to operate according to the flight plan.

15. The system of claim 1, wherein the modeled spectrum quality metrics include at least one of a signal to noise ratio (SNR), a noise floor, a probability of packet loss, or error correction.

16. The system of claim 1, wherein the at least one processor is further configured to: upon a change to the flight plan, obtain an updated C2 communication plan for the flight of the aircraft; and output updated instructions to operate the at least one radio according to the updated C2 communication plan.

17. The system of claim 1, wherein the C2 communication plan is a real-time C2 communication plan for the flight of the aircraft.

18. The system of claim 1, wherein at least one of the at least one processor is located in the aircraft.

19. The system of claim 1, wherein at least one of the at least one processor is located on the ground.

20. A method, comprising:
obtaining, by at least one processor, information of a flight plan associated with a flight of an aircraft, the flight plan including information of a planned flight start point, a planned flight end point, a planned flight route, and a planned timing associated with the planned flight route, wherein one or more of the at least one processor are communicatively coupled to at least one radio;
obtaining, by the at least one processor, a command and control (C2) communication plan for the flight of the aircraft, the C2 communication plan including information of a spectrum allocated for each coverage area aligned with the flight plan, modeled spectrum quality metrics along the planned flight route, anticipated tower to tower handoff locations along the planned flight route, and anticipated antenna-to-antenna handoff locations by a single radio tower along the planned flight route;
outputting, by the at least one processor, instructions to operate the at least one radio to connect with at least one given antenna of at least one given radio tower at a given time according to the C2 communication plan; and
connecting, by the at least one radio, with the at least one given antenna of the at least one given radio tower at the given time according to the C2 communication plan.

* * * * *